(12) United States Patent
Amthor et al.

(10) Patent No.: US 12,505,333 B2
(45) Date of Patent: Dec. 23, 2025

(54) METHOD AND DEVICE FOR NON-CONVOLUTIONAL IMAGE PROCESSING

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 798 days.

(21) Appl. No.: 17/828,164

(22) Filed: May 31, 2022

(65) Prior Publication Data
US 2022/0398703 A1 Dec. 15, 2022

(30) Foreign Application Priority Data
Jun. 2, 2021 (DE) .................... 10 2021 114 350.0

(51) Int. Cl.
*G06N 3/045* (2023.01)
*G06F 17/11* (2006.01)
*G06N 3/04* (2023.01)
*G06T 3/4046* (2024.01)
*G06T 5/20* (2006.01)
(Continued)

(52) U.S. Cl.
CPC ............. *G06N 3/045* (2023.01); *G06F 17/11* (2013.01); *G06N 3/04* (2013.01); *G06T 3/4046* (2013.01);
(Continued)

(58) Field of Classification Search
CPC . G06T 2207/20084; G06T 2207/20081; G06T 7/0012; G06T 2207/30096; G06T 5/60; G06T 5/70; G06T 3/4046; G06T 7/174; G06T 2207/10056; G06T 2207/30004; G06T 9/002; G06T 3/4053;
(Continued)

(56) References Cited

U.S. PATENT DOCUMENTS
2020/0085382 A1* 3/2020 Taerum ................ A61B 5/7264

FOREIGN PATENT DOCUMENTS
DE    10 2019 130 930 A1    5/2021

OTHER PUBLICATIONS
Chen, Hanting, et al. "Universal adder neural networks." arXiv preprint arXiv:2105.14202 (2021). (Year: 2021).*
(Continued)

*Primary Examiner* — Courtney Joan Nelson
(74) *Attorney, Agent, or Firm* — Collard & Roe, P.C.

(57) ABSTRACT

A method, device, and computer program product are designed for non-convolutional image processing in microscopy of an input image into an output image using an artificial neural network with at least one contracting path including layers, at least one expanding path including layers, and at least one filter kernel. The method includes determining, in one or multiple artificial neural network layers, a similarity metric between at least one filter kernel and one output of the previous layer. Additionally, in at least one layer of the contracting path, the resolution of the output of the previous layer is reduced, and, in at least one layer of the expanding path, the resolution of the output of the previous layer is increased. The first artificial neural network layer treats the input image as the output of the previous layer, and the output of the last artificial neural network layer is the output image.

15 Claims, 3 Drawing Sheets

(51) Int. Cl.
  *G06T 5/60* (2024.01)
  *G06V 10/74* (2022.01)
  *G06V 10/82* (2022.01)

(52) U.S. Cl.
  CPC .................. *G06T 5/20* (2013.01); *G06T 5/60* (2024.01); *G06V 10/761* (2022.01); *G06V 10/82* (2022.01); *G06T 2207/10056* (2013.01); *G06T 2207/20081* (2013.01); *G06T 2207/20084* (2013.01)

(58) Field of Classification Search
  CPC .......... G06T 5/20; G06V 10/82; G06V 10/40; G06V 10/774; G06V 10/761; G06N 3/08; G06N 3/045; G06N 3/02; G06N 3/04; G16H 30/40; G16H 30/20; G06F 17/11
  See application file for complete search history.

(56) References Cited

OTHER PUBLICATIONS

H. Chen et al., "AdderNet: Do We Really Need Multiplications in Deep Learning?," 2020 IEEE/CVF Conference on Computer Vision and Pattern Recognition (CVPR), Seattle, WA, USA, 2020, pp. 1465-1474, doi: 10.1109/CVPR42600.2020.00154. (Year: 2020).*
Chen, Hanting et al.: Adder Neural Networks, Learning Convolutions with Only Additions. arXiv preprint arXiv:2105.14202v2, Jun. 1, 2021. URL: https://arxiv.org/abs/2105.14 20 2v2 [retrieved on Nov. 9, 2021], pp. 1-13.
Gondara, Lovedeep: Medical Abstract; Medical image denoising using convolutional denoising autoencoders. In: 2016 IEEE 16th international conference on data mining workshops (ICDMW), IEEE, 2016, pp. 241-246.

* cited by examiner

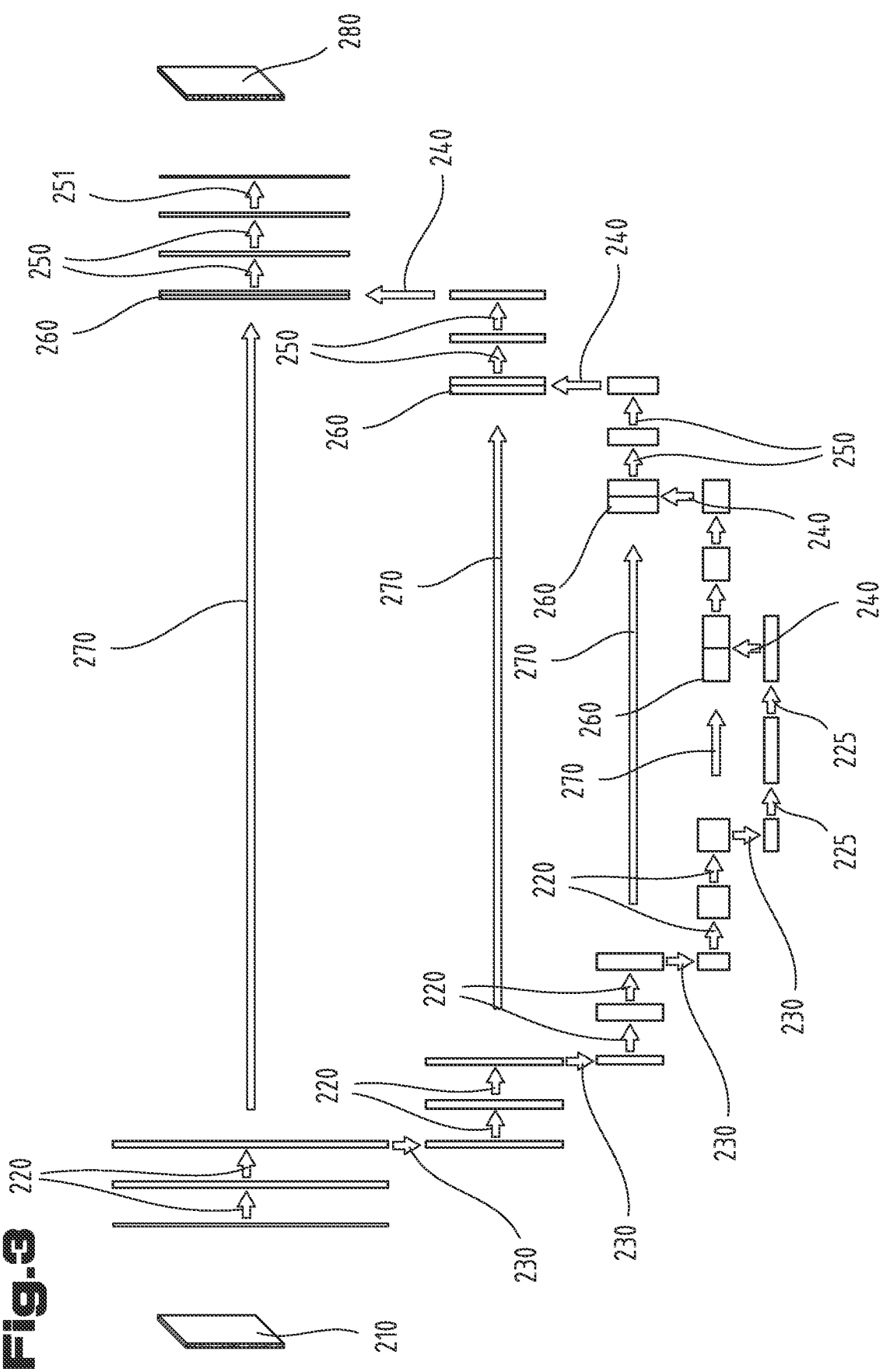

METHOD AND DEVICE FOR NON-CONVOLUTIONAL IMAGE PROCESSING

CROSS REFERENCE TO RELATED APPLICATIONS

Applicant claims priority under 35 U.S.C. § 119 of German Application No. 10 2021 114 350.0 filed Jun. 2, 2021, the disclosure of which is incorporated by reference.

BACKGROUND OF THE INVENTION

1. Field of the Invention

The invention relates to the non-convolutional processing of an input image into an output image in microscopy by means of an artificial neural network.

2. Description of the Related Art

The present invention may, in principle, be applied in a neural network in any way of image processing, i.e. editing and processing an input image into an output image. Artificial neural networks (ANN), also simply referred to as neural networks, which is a special form of machine learning, can be used for image processing in a variety of ways. Some examples for this are:

Denoising, or noise reduction (NR), of images, wherein a neural network can generate a lower-noise image from noisier images.

Super resolution, also known as high resolution or resolution enhancement, wherein a neural network may increase the resolution of images. In this process, it is particularly possible to achieve a higher quality by means of a higher computing effort. Such methods are applied, among other things, for medical purposes, photography of astronomical objects, forensic analyses of image data, live-cell imaging, and many more.

Deconvolution, whereby the resolution of an image may also be increased by back-calculating a previously applied convolution. A point spread function (PSF) describes the convolution of a source to a recorded signal. Deconvolution then tries to reverse the effects described by the PSF. For deconvolution, a known PSF may be used. However, there is also a so-called blind deconvolution, for which no PSF must be known.

A further application is, for example, the artificial aging or rejuvenation of depicted people, which is also occasionally achieved by means of generative adversarial networks (GAN). GAN are part of supervised learning and consist of two artificial neural networks, one of which, the generator, modifies images (so-called candidates), and the other of which, the discriminator, then evaluates the candidates. Both incorporate the results thereof into their learning, so that the candidates keep getting better, within the meaning of the goal to be achieved, wherein the generator tries to learn how to produce images which the discriminator cannot distinguish from real images, whereas the discriminator tries to learn to distinguish the constantly improving candidates of the generator from genuine, real images.

Compressed sensing (also compressive sensing, compressive sampling, or sparse sampling), wherein a neural network can capture and reconstruct sparsely populated signals or information sources in image data. As the information can be compressed without substantial loss of information due its redundancy, this is efficiently utilized when sampling the signals for significantly reducing the sampling rate compared to conventional methods.

In the context of microscopy, virtual staining refers to generating images of a target contrast (e.g. fluorescence) from corresponding images of a source contrast (e.g. brightfield) by means of image analysis and processing. In particular, image-to-image methods based on deep learning as well as other machine learning models are used for this process. Specifically, in the past, deep learning methods were used which are based on convolutional neural networks (CNNs). In these networks, convolution is a central operation.

FIG. 1A shows, for example, a picture of cells in a phase contrast image, and FIG. 1B shows the same cell region after it has been dyed with a certain dye (for example 4',6-diamidino-2-phenylindole, DAPI for short, as a fluorescent dye used in fluorescence microscopy for marking DNA (deoxyribonucleic acid)). FIG. 1B symbolizes a picture which was recorded with a fluorescence contrast and is meant to adumbrate a good acceptance of the dye by the cells. As the cells, depending on type and quality, do not always take on the dye equally well, and staining is also elaborate and may additionally influence the sample quality negatively, it is desirable to simulate staining virtually by means of a neural network. This can be seen for example in FIG. 1C, in which a conventional convolutional network has virtually stained the sample from FIG. 1A.

The invention is also applicable to other types of image processing or image enhancement.

In fact, virtual staining takes increasingly more priority in research institutions and also for manufacturers. The methods to date, however, always use convolutional neural networks (CNNs).

The convolution operations in CNNs are based on multiplications and are therefore complex mathematical functions, the degree of complexity of which accordingly costs computation time and energy.

SUMMARY OF THE INVENTION

It is the object of the invention to eliminate these shortcomings of the prior art and to suggest an improved or at least alternative method for image processing in neural networks.

This object is achieved by means of a device and a method according to the invention.

BRIEF DESCRIPTION OF THE DRAWINGS

Other objects and features of the invention will become apparent from the following detailed description considered in connection with the accompanying drawings which respectively show a very simplified representation. It is to be understood, however, that the drawings are designed as an illustration only and not as a definition of the limits of the invention.

In the drawings,

FIG. 3 shows an exemplary course according to the invention of an image processing in a non-convolutional neural network.

DETAILED DESCRIPTION OF PREFERRED EMBODIMENTS

First of all, it is to be noted that in the different embodiments described, equal elements are provided with equal reference numbers and/or equal element designations, where the disclosures contained in the entire description may be analogously transferred to equal elements with equal reference numbers and/or equal element designations. Moreover, the specifications of location, such as at the top, at the bottom, at the side, chosen in the description refer to the directly described and depicted figure and in case of a change of position, these specifications of location are to be analogously transferred to the new position.

In this invention, a non-convolutional (i.e. not based on CNNs) solution for image-to-image depictions in general and virtual staining as an exemplary application are described.

The following describes a method according to the invention for non-convolutional image processing in microscopy of an input image into an output image by means of a neural network with at least one contracting path consisting of layers, at least one expanding path consisting of layers, and at least one filter kernel.

The image processing is preferably an image regression or an image-to-image depiction.

The method comprises determining, in one or multiple layers of the ANN, a similarity metric between at least one filter kernel and one output of the previous layer. Moreover, the method comprises reducing, in one or multiple of the layers of the contracting path, the resolution of the output of the previous layer, as well as increasing, in one or multiple of the layers of the expanding path, the resolution of the output of the previous layer, wherein the first layer of the ANN as the input image is treated as output of the previous layer, and the output of the last layer of the ANN is the output image.

It is known that multiplication is slower than addition, but the known solutions for virtual staining always use CNNs.

Figure 2:
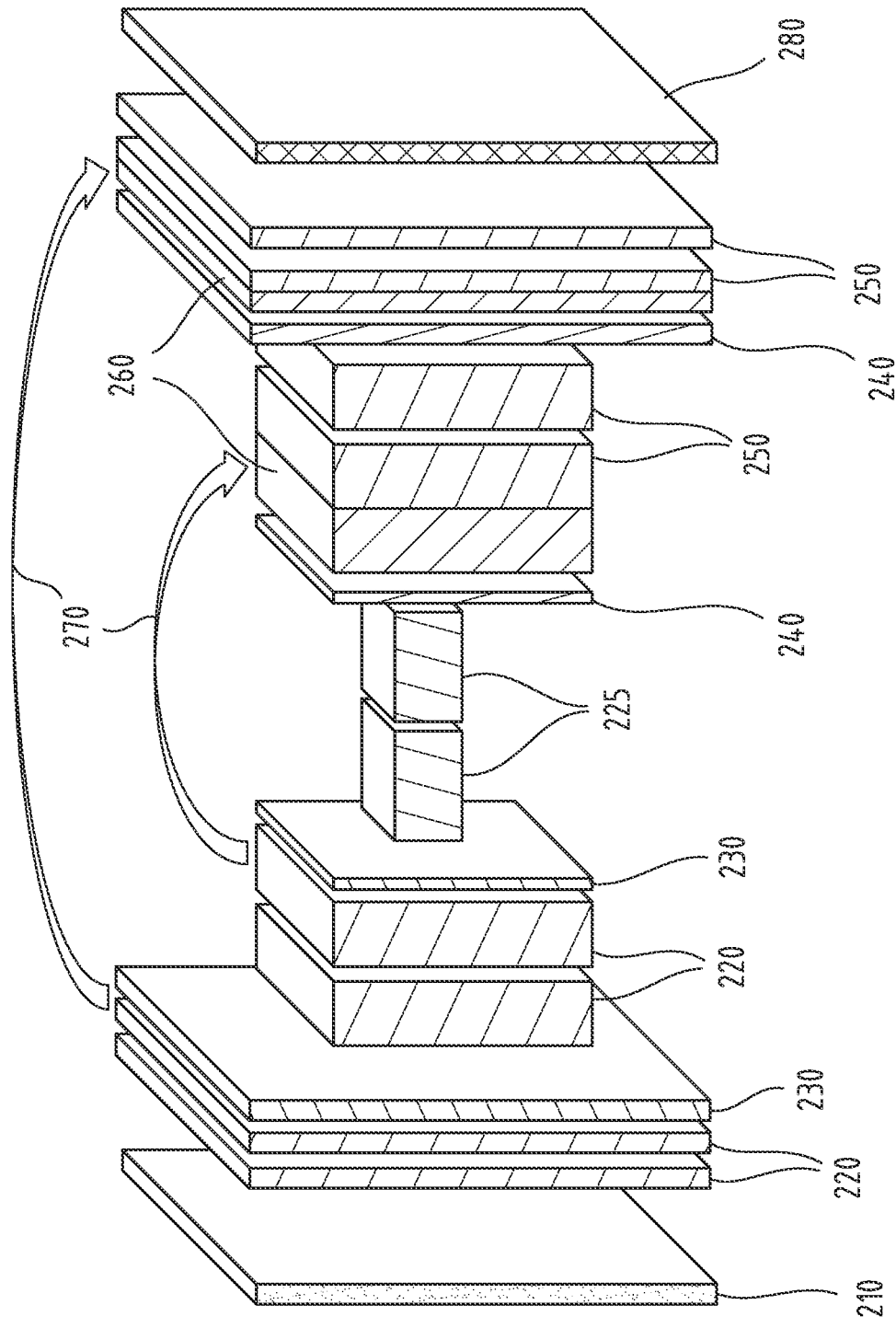
FIG. 2 shows an exemplary structure of a non-convolutional neural network according to the invention for image processing.

FIG. 2 shows an exemplary structure of a non-convolutional neural network according to the invention for image processing. FIG. 3 shows an exemplary course according to the invention of image processing in a non-convolutional neural network.

Therein, an input image 210 is input. This is then processed in the first layers 220 and 230.

The course shown in FIG. 3 consists of a contracting path 220 and 230 as well as an expanding path 240, 250 and 260. The paths are similar in terms of their course to a conventional convolutional network. However, in this case, instead of the conventional convolutional layers, no convolution operation is used in the layers, but rather a more efficient element-wise sum operation is used.

In this process, a repeated determination of the similarity metric in the contracting path in the elements 220 and the subsequent reduction of the resolution 230 is used to increase the number of the channels, for example double them, whereby the dimensions of the image decrease accordingly.

The contracting path may also be referred to as an encoder path, and its function may be implemented, for example, by striding or pooling.

At the end of the contracting path, the processing transitions into the so-called bottleneck, in whose layers non-linear transformations are performed by element-wise sum functions. In this process, the resolution and number of channels remains the same.

In the expanding path, the number of channels is reduced again, for example halved, in the elements 240, by means of increasing the resolution as well as further applications of determining the similarity metric 250. Increasing the resolution is preferably not effected by a transposed convolution but rather by a bilinear interpolation, for example, in order to re-gain the original resolution.

The expanding path may also be referred to as decoder path, and its function may be implemented, for example, by a different type of interpolation in addition to the bilinear interpolation or by a transposed element-wise sum function.

Optionally, skip connections 270 may be used, meaning that a part of the image is copied in the contracting path and carried over into the expanding path, where the separated parts 260 are attached again in order to improve the output image (of the respective layer).

In this regard, skip connections may be helpful for restoring fine structures in the output image. Thus, a possibly occurring blurring, which develops due to increasing the resolution, may be compensated by means of interpolation. Possibly, a cropping due to the loss of edge pixels is necessary.

Alternatively or additionally, residual connections may be used. In this regard, an identity function is realized either from the start of a layer to the end of the same layer or from the first to the last layer. In this regard, a residual training is realized in the context of residual learning, i.e. instead of the result image, only the residual between the input image and the output image (a layer, and/or input of the first and output of the last layer) is learned. This is generally easier for enhancing the image and details, such as sharp edges, are preserved.

In this regard, FIG. 3 shows a network with 23 layers, although a different number of layers is possible, as well. Furthermore, it is possible that in some layers, no reducing, increasing, or determining is performed.

In each the layers 220 and 250, in which the similarity metrics are determined, a filter kernel is applied to the image, whereby the number of the channels increases whereas the dimensions are reduced.

In this regard, the similarity metrics may be performed as sum operations and are a measure for a similarity between a kernel and the input image.

The sum functions are described as element-wise as the sums are formed in an element-wise manner. This means that, upon moving the kernel over the image to be processed, in each case, the values of the pixels of the filter kernel are connected to the pixels of the image below by means of a sum operation (sum or subtraction). The results are then added up.

A possible variation consists in using blueprint separable convolutions (BSConv) (DE 10 2019 130 930). The 3D filters described here can be approximated by means of the filter separation described therein. For this process, the filter are represented as a consequence of a pointwise and a depthwise and/or layer-wise operation. In the mentioned document, these operations are convolutions. When applying the present invention, at least the depthwise convolution could be replaced by the application of a non-convolutional metric. In this regard, the pointwise operation could also be considered as a weighting of the individual 2D filters and thus as a pure multiplication and is therefore also non-convolutional.

Varying the sequence of the two operations then results in either an equivalent to the "blueprint separable convolution" (if the pointwise operation is performed first, before the depthwise operation) or, in the case of a reverse order, an equivalent to the "depthwise separable convolution" (if the depthwise operation is performed first, before the pointwise operation). Further details can be gathered from the following publications: "Rethinking Depthwise Separable Convolutions: How Intra-Kernel Correlations Lead to Improved MobileNets", by Daniel Haase and Manuel Amthor, as well as "MobileNets: Efficient Convolutional Neural Networks for Mobile Vision Applications" by Andrew G. Howard et al.

Furthermore, filter can also be separated spatially.

Such a sum function may, for example, be a sum of a distance of image elements for each image channel between image elements of the input image and the filter kernel. This means that for each pixel, the distance between each of the pixels of the kernel and the pixel underneath of the input image is calculated when the kernel is moving over the input image.

The output of a layer can be determined by means of a sum function using the following formula, for example:

$$A(x_A, y_A, c_A) = \sum_{i=1}^{e}\sum_{j=1}^{d}\sum_{k=1}^{c_E} D(E(x_A + i, y_A + j, k), F(i, j, k, c_A))$$

A being the output image with $c_A$ channels, E being the input image with $c_E$ channels, F being the filter kernel with the dimensions d and e, and D being a distance function.

With the aid of the above formula, the respective value for the output image is determined for each location $x_A$, $y_A$ in the respective channel $c_A$. In this regard, the indexes i, j, and k move over the respective region: i and j over the dimensions d and e of the kernel. Wherein these may also be identical, i.e. d=e. The kernel can thus have a size of, for example, 3×3 pixels, or also 2×3, 3×4, etc.

The distance function in the above formula may be formed according to a p-norm. Thus, the single distance can be calculated with the L1-norm, i.e. as a sum of the absolute values of the differences of the pixel values.

The distance may also be calculated with the L2-norm, i.e. as a sum of the squares of the absolute values of the differences of the pixel values.

All further p-norms can accordingly also be used as a distance calculation. Other distance functions can also be applied accordingly, here.

Alternatively, the similarity metric may be formed according to a radial base function or a polynomial function. In this case, so-called RBF kernels or polynomial kernels are used, wherein these kernels are not to be confused with the filter kernels of a neural network. Thus, these designations for the similarity metric are not used anymore, but rather kernel or filter kernel always refers to the kernel(s) or filter kernel(s) of neural networks.

Optionally, a regression 251 may be performed in the last layer. This may be effected, for example, in a common fully connected layer.

Preferably, however, the regression 251 is also performed by means of an element-wise sum function, which may correspond to those in the layers before but may also be designed differently, for example by using a different distance. A further option is that determining the similarity metric is normalized, for example by a batch normalization. This normalization may also optionally comprise a scale and shift operation. Nevertheless, the regression 251 may also be effected by a convolution, more specifically by a 1×1 convolution.

However, the normalization, may be performed optionally after each layer, independently from the regression 251. For the normalization, it is also possible to use a group normalization or an instance normalization instead of the batch normalization. It is also possible to use any other known normalization. Batch, group, and instance normalizations are listed merely as examples. The scale and shift operation may be applied optionally in the case of any normalization.

As described initially, however, the image processing may be any other type of image processing besides virtual staining, in particular any type of image enhancement, such as denoising, super resolution, a deconvolution, or compressed capturing.

At the end of processing is the output image 280.

With the aid of the method described here, it is also possible to train a neural network. Generating training data of a source contrast (e.g. wide field) and the target contrast (fluorescence) is possible. This may take place with different samples/devices, also independently of one another. For this, either a registration of the source and target data would be necessary—so they can be assigned to one another—or a model is used which does not require the registration, e.g. cycle GANs. Cycle GANs are a technology in which image-to-image translation models are automatically trained without paired examples. The models are trained in an unsupervised manner, using a collection of images from the source and target domain, which do not have to be linked in any way.

Using conventional GAN technologies is equally possible.

For using a neural network as described here, it is possible to generate a source contrast from which it is possible to project onto the virtual fluorescence.

Figure 1A:
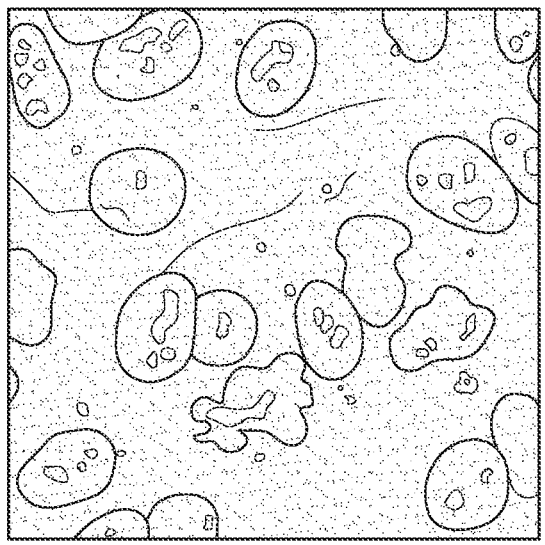
FIG. 1A shows a cell sample recorded in a phase contrast image.
Figure 1B:
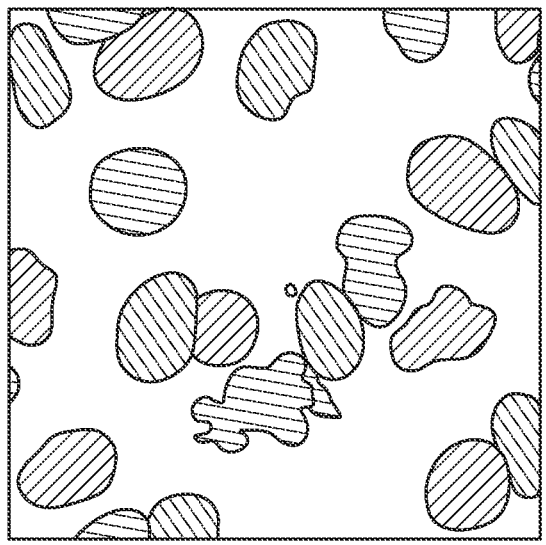
FIG. 1B shows the cell sample recorded in a fluorescence contrast.
Figure 1C:
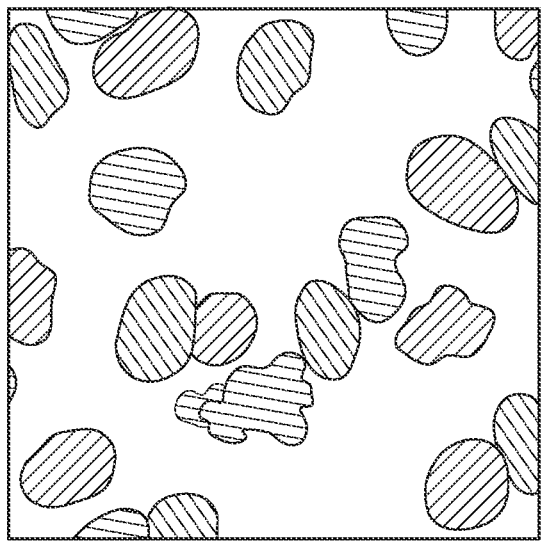
FIG. 1C shows the result of image processing for virtual staining of image 1A by a CNN according to the prior art.
Figure 1D:
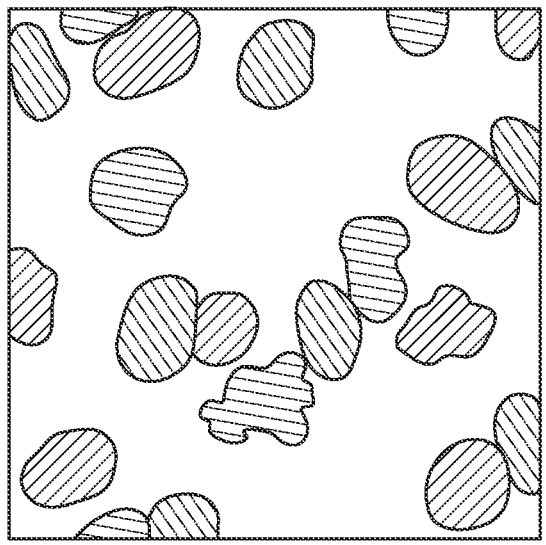
FIG. 1D shows the result of an image invention processing, according to the invention, for virtual staining of image 1A by a non-convolutional neural network.

FIG. 1D shows the result 280 of an image processing, according to the invention, for virtual staining of the image 1A by means of a non-convolutional neural network, meaning virtual staining by neural networks without convolution operations. The result shows that it is possible to perform virtual staining even without convolutional networks (CNNs).

A further exemplary embodiment is a device for non-convolutional image processing in microscopy of an input image into an output image, preferably a computer, by means of an artificial neural network with at least one contracting path consisting of layers, at least one expanding path consisting of layers, and at least one filter kernel. The device comprises a calculation unit configured to determine, in one or multiple layers of the artificial neural network, a similarity metric between at least one filter kernel and one output of the previous layer. The calculation unit is further configured to reduce, in one or multiple layers of the contracting path, the resolution of the output of the previous layer, and to increase, in one or multiple layers of the expanding path, the resolution of the output of the previous layer. In this process, the first layer of the artificial neural network treats the input image as the output of the previous layer, and the output of the last layer of the artificial neural network is the output image.

The modifications for the method mentioned above apply equally for the device.

The further exemplary embodiments show possible embodiment variants, while it should be noted at this point that the invention is not limited to these particular illustrated embodiment variants thereof, but rather various A further embodiment is a computer program product with a program for a data processing device, comprising software code sections for performing the steps of the method described above when the program is run on the data processing device.

This computer program product may comprise a computer-readable medium, on which the software code sections are stored, wherein the program can be loaded directly into an internal storage of the data processing device.

Combinations of the individual embodiment variants are possible and this possibility of variation owing to the teaching for technical action provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

Although only a few embodiments of the present invention have been shown and described, it is to be understood that many changes and modifications may be made thereunto without departing from the spirit and scope of the invention.

LIST OF REFERENCE NUMBERS

210 Input image
220 Determining the similarity metric in the contracting path
225 Determining the similarity metric in the bottleneck
230 Reducing the resolution
240 Increasing the resolution
250 Determining the similarity metric in the expanding path
251 Regression
260 Attachment blocks of the skip connections
270 Skip connections
280 Output image

What is claimed is:

1. A computer-implemented method for non-convolutional image processing in microscopy of an input image into an output image by means of an artificial neural network with at least one contracting path comprising layers, at least one expanding path comprising layers, and at least one filter kernel, wherein the method comprises:
determining, in one or multiple layers of the artificial neural network, a similarity metric between at least one filter kernel and one output of a previous layer;
reducing, in one or multiple layers of the contracting path, a resolution of the output of the previous layer, and
increasing, in one or multiple layers of the expanding path, the resolution of the output of the previous layer,
wherein a first layer of the artificial neural network treats the input image as the output of the previous layer, and the output of a last layer of the artificial neural network is the output image.

2. The method according to claim 1, wherein the similarity metric uses an element-wise sum function.

3. The method according to claim 1, wherein the similarity metric uses a sum of a distance of image elements for each image channel between image elements of the output of the previous layer and the filter kernel.

4. The method according to claim 1, wherein the output of a layer is determined by a function $$A(x_A, y_A, c_A) = \sum_{i=1}^{e} \sum_{j=1}^{d} \sum_{k=1}^{c_E} D(E(x_A + i, y_A + j, k), F(i, j, k, c_A)),$$

A being the output of the layer with $c_A$ channels, E being the output of the previous layer with $c_E$ channels, F being the filter kernel with dimensions d and e, and D being the similarity metric, and
wherein the above formula determines a respective value of the output of the layer for each point $x_A$, $y_A$ in a respective channel $c_A$.

5. The method according to claim 1, wherein the similarity metric and is formed
as a distance function formed according to a p-norm,
according to a radial base function, or
according to a polynomial function.

6. The method according to claim 1,
wherein the filter kernel has an equal size in both dimensions, i.e. d=e,
wherein reducing is performed in at least one contracting path by striding or pooling, and/or
wherein increasing is performed in at least one expanding path by bilinear interpolation, a different type of interpolation, or by a transposed element-wise sum function.

7. The method according to claim 1, wherein the method further comprises, in one or multiple layers, an application of skip connections, which supplement the increasing of the resolution in the expanding path in order to improve the output of a respective layer.

8. The method according to claim 1, wherein a regression is performed in a last layer, and/or
wherein the last layer is a completely connected layer, or
wherein the regression uses a further element-wise sum function.

9. The method according to claim 1, wherein the method, after one or multiple layers, further comprises a normalization.

10. The method according to claim 1, wherein the image processing is a virtual staining, a denoising, a super resolution, a deconvolution, a compressed capturing, or a different type of image enhancement.

11. The method according to claim 1, for training a neural network.

12. The method according to claim 11, wherein training is performed with a further neural network in a context of a generative adversarial network training.

13. A computer program product with a program stored on a non-transitory medium for a data processing device, comprising software code sections for performing the steps according to claim 1 when the program is run on the data processing device.

14. The computer program product according to claim 13, wherein the computer program product comprises a computer-readable medium, on which the software code sections are stored, wherein the program can be loaded directly into an internal storage of the data processing device.

15. A device for non-convolutional image processing in microscopy of an input image into an output image, with an artificial neural network with at least one contracting path comprising layers, at least one expanding path comprising layers, and at least one filter kernel, wherein the device is configured to perform the method according to claim 1, and wherein the device comprises a calculation unit configured to determine, in one or multiple layers of the artificial neural network, a similarity metric between at least one filter kernel and one output of a previous layer;

reduce, in one or multiple layers of the contracting path, a resolution of the output of the previous layer; and increase, in one or multiple layers of the expanding path, the resolution of the output of the previous layer, wherein a first layer of the artificial neural network treats the input image as the output of the previous layer, and the output of a last layer of the artificial neural network is the output image.

* * * * *